United States Patent
DeFrance

(10) Patent No.: US 9,677,306 B2
(45) Date of Patent: Jun. 13, 2017

(54) HOOK LATCH

(71) Applicant: Lisi Aerospace, Paris (FR)

(72) Inventor: Vincent DeFrance, Bourges (FR)

(73) Assignee: LISI Aerospace, Paris (FR)

( * ) Notice: Subject to any disclaimer, the term of this patent is extended or adjusted under 35 U.S.C. 154(b) by 0 days.

(21) Appl. No.: 13/914,265

(22) Filed: Jun. 10, 2013

(65) Prior Publication Data

US 2013/0328326 A1 Dec. 12, 2013

(30) Foreign Application Priority Data

Jun. 11, 2012 (FR) ...................... 12 55417

(51) Int. Cl.
E05C 19/12 (2006.01)
E05C 19/10 (2006.01)
B64D 29/06 (2006.01)
B65D 45/34 (2006.01)
E05C 19/14 (2006.01)

(52) U.S. Cl.
CPC .............. *E05C 19/10* (2013.01); *B64D 29/06* (2013.01); *E05C 19/145* (2013.01); *E05C 19/14* (2013.01); *Y10T 292/0918* (2015.04)

(58) Field of Classification Search
CPC ....................................... E05C 19/14
USPC .............. 292/114, 256.69, DIG. 49
See application file for complete search history.

(56) References Cited

U.S. PATENT DOCUMENTS

| 2,904,141 | A | * | 9/1959 | Henrichs | ...................... | 403/321 |
| 2,927,812 | A | * | 3/1960 | Smith et al. | .................. | 292/196 |
| 4,053,177 | A | | 10/1977 | Stammreich | | |
| 4,116,479 | A | * | 9/1978 | Poe | ................................ | 292/113 |
| 4,159,137 | A | * | 6/1979 | Richter | ........................ | 292/123 |
| 4,183,564 | A | * | 1/1980 | Poe | ................................ | 292/113 |
| 4,318,557 | A | | 3/1982 | Bourne et al. | | |
| 4,530,529 | A | * | 7/1985 | Poe et al. | ...................... | 292/113 |
| 4,602,812 | A | * | 7/1986 | Bourne | ........................ | 292/113 |

(Continued)

FOREIGN PATENT DOCUMENTS

FR 2966490 4/2012

OTHER PUBLICATIONS

Estrela Calpe, Jordi, Search Report, FR 1255417, Feb. 11, 2013, 5 pages, Institut National de la Propriété Industrielle.

*Primary Examiner* — Carlos Lugo
(74) *Attorney, Agent, or Firm* — Henricks, Slavin & Holmes LLP

(57) ABSTRACT

The invention pertains to a lock (10) for locking a mobile structure to and unlocking it from a fixed structure (11) on a vehicle, one of the two structures containing a first keeper (14), the other structure containing a second pin (16) around which the lock can pivot, the lock comprising:

Figure 1:
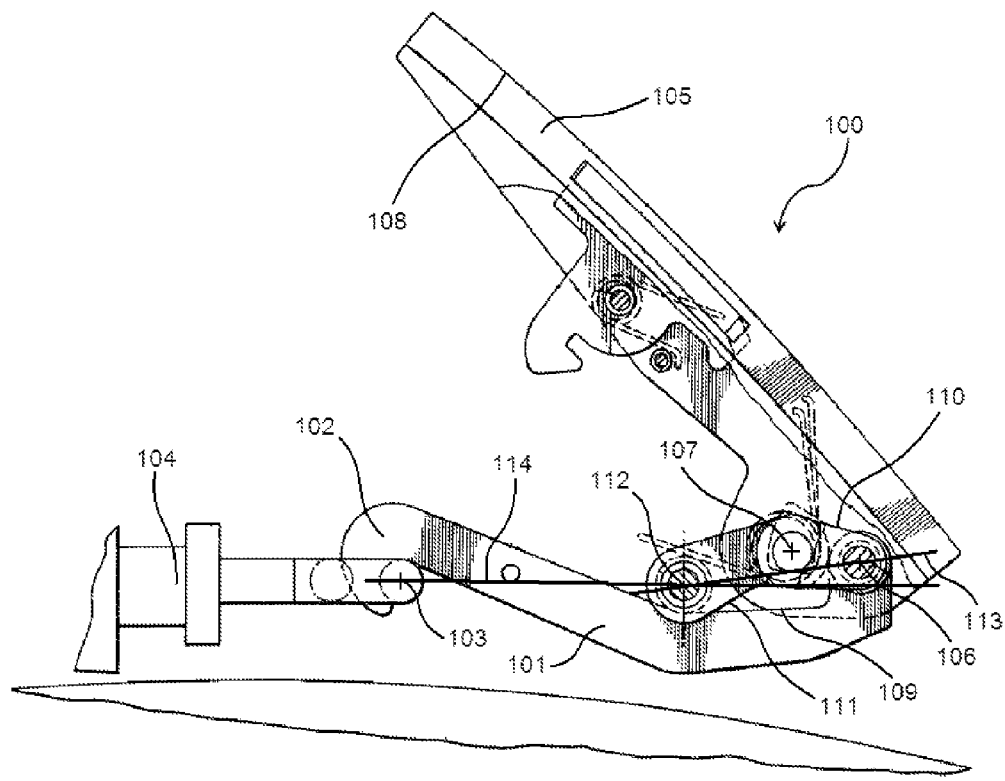

A lock strut (19) containing a hook (33) able to latch onto the keeper;

A handle (17) with a third pin (28) around which the lock strut can be guided in its rotation, the second pin (16) being located toward the handle (17) in relation to a plane (29) formed between the first keeper (14) and the third pin; and a fourth pin (46), located between the handle and a first side (35) of the lock strut;

A first connecting rod (45) linking the third pin (28) to the fourth pin (46);

A second connecting rod (48) linking the fourth pin (46) to the second pin (16), and a fifth pin (49) located against a second side (50) of the lock strut opposite the first side (35).

11 Claims, 3 Drawing Sheets

(56) References Cited

U.S. PATENT DOCUMENTS

| | | | | |
|---|---|---|---|---|
| 4,743,052 A | * | 5/1988 | Stammreich et al. | 292/113 |
| 4,768,815 A | | 9/1988 | Harmon | |
| 4,858,970 A | * | 8/1989 | Tedesco et al. | 292/113 |
| 5,152,559 A | * | 10/1992 | Henrichs | 292/113 |
| 5,620,212 A | * | 4/1997 | Bourne et al. | 292/113 |
| 5,915,765 A | * | 6/1999 | Sternberger | 292/256.69 |
| 5,984,382 A | * | 11/1999 | Bourne et al. | 292/113 |
| 6,325,428 B1 | * | 12/2001 | Do | 292/113 |
| 6,343,815 B1 | * | 2/2002 | Poe | 292/113 |
| 8,573,934 B2 | * | 11/2013 | Soulier et al. | 415/214.1 |

* cited by examiner

HOOK LATCH

The invention pertains to a hook latch with a toggle lever.

More specifically, the invention pertains to a hook latch intended to lock a mobile structure to, and unlock it from, a fixed structure of a vehicle—for example, an aircraft—whose opening and closing kinematics rely on the use of a combination of two toggle levers.

A hook latch comprising a combination of two toggle levers is known from the prior art. For example, such a lock is described in the document U.S. Pat. No. 4,318,557 and shown in FIG. 1.

Such a lock 100 comprises a lock strut 101 consisting of a hook 102 able to latch onto a keeper 103 that is part of a structure 104, a handle 105 with a first pin 106 around which the lock strut 101 is guided in its rotation, and a second pin 107 parallel to the first pin 106 and placed between one edge 108 of the handle 105 and one side 109 of the lock strut 101, which are parallel to the second pin 107. The lock 100 comprises a first connecting rod 110 linking the first pin 106 to the second pin 107 and a second connecting rod 111 linking the second pin 107 to a third pin 112 parallel to the second pin 106 and held by the structure 104, the fourth pin 112 being placed between the edge 108 of the handle 105 and the side 109 of the lock strut 101.

A first toggle lever is formed by the first and second connecting rods (110, 111) and is articulated to the second pin 107. The first toggle lever is considered to be locked when the second pin 107 is located below a plane 113 formed by the first and third pins (106, 112). The first toggle lever unlocks when the second pin 107 moves above the plane 113.

A second toggle lever is formed between the keeper 103 and the third pin 112, and is articulated to the first pin 106. The second toggle lever is considered locked when the first toggle lever is locked.

The use of a second toggle lever allows the hook 102 to be moved forward significantly in relation to the keeper 103 when unlocking the lock 100, the first pin 106 being located far from the keeper 103. The use of a second toggle lever also makes it possible to limit the overall dimensions of the lock 100, as, when the first toggle lever unlocks, the first pin 106 moves toward a plane 114 formed by the keeper 103 and the third pin 112, without ever passing it.

However, such a lock requires the edge 108 of the handle 105 to have a wide radius of curvature. In fact, with such a lock, the first pin 106 must not only be placed far from the keeper 103, but also sufficiently far above the plane 114 to take up forces exerted on the keeper 103 and/or the third pin 112—caused, for example, by vibrations or shocks—in order to ensure that the first toggle lever remains in the locked position. Therefore, such a lock cannot be incorporated into a structure with a small radius of curvature.

Therefore, there is a need to develop a lock that allows both the hook to be moved toward the keeper, and the incorporation of said lock into structures with a small radius of curvature.

One aspect of the present invention resolves this technical problem.

More specifically, the invention pertains to a lock for locking a mobile structure to and unlocking it from a fixed structure on a vehicle, one of the two structures containing a keeper, the other structure containing a first pin around which the lock can pivot. The lock comprises:

A lock strut containing a hook able to latch onto the first keeper;

A handle with a second pin around which the lock strut can be guided in its rotation, the first pin being located toward the handle in relation to a plane formed between the keeper and the second pin; the handle also having a third pin, located between the handle and a first side of the lock strut;

A first connecting lever linking the second pin to the third pin; and,

A second connecting lever linking the third pin to the first pin, the second connecting lever also comprising a fourth pin located against a second side of the lock strut opposite the first side.

Such a lock has the advantage of being able to be adapted to a structure with a small radius of curvature while significantly moving the hook forward toward the keeper.

Preferably, the second connecting rod is L-shaped.

Preferably, the fourth pin is able to slide along the second side of the lock strut when the hook is latched onto or unlatched from the keeper.

According to one embodiment of the invention, the lock strut comprises a distal section opposite the hook, consisting of a groove forming a first stop able to block the first pin from moving toward the hook and a second stop able to block said first pin from moving in a direction away from the hook.

The length of the second connecting lever may then be advantageously defined so that when the hook is latched onto the keeper, the first pin is pushing against the first stop.

The length of the second connecting lever may also be advantageously defined so that when the hook is not latched on to the keeper, the first pin is pushing against the second stop.

Preferably, the handle comprises sidewalls each having an oblong opening, the third pin being able to slide in said openings.

Preferably, the second side has a convex edge, from a first end located near the hook to a second end opposite the first end, located near the second pin.

According to one embodiment of the invention, the fourth pin is linked to a control rod able to control the triggering of an adjacent mechanism when the lock is engaged in a locked or unlocked position.

Figure 2:
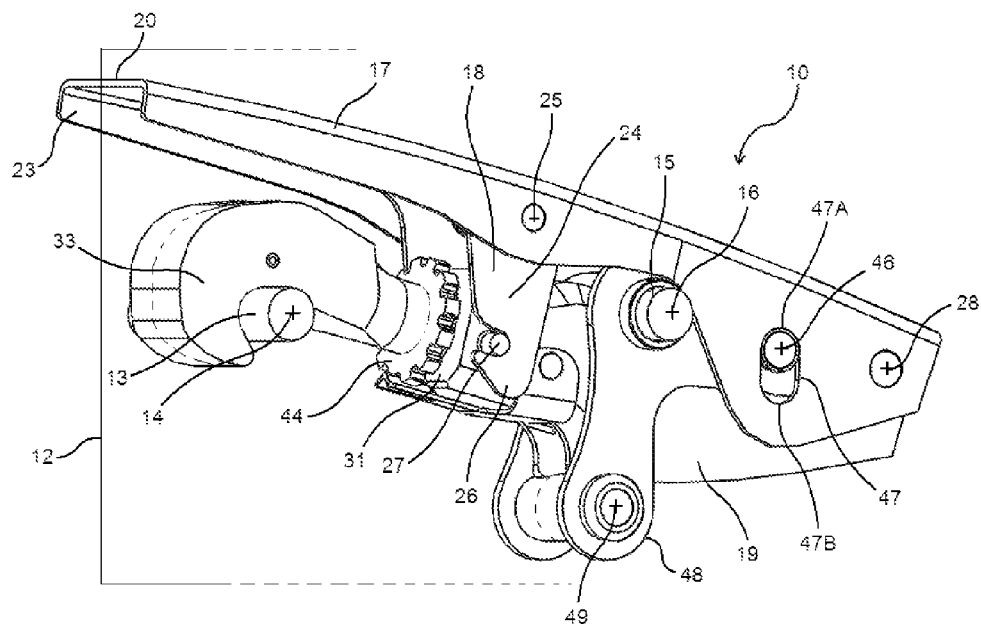
Figure 3:
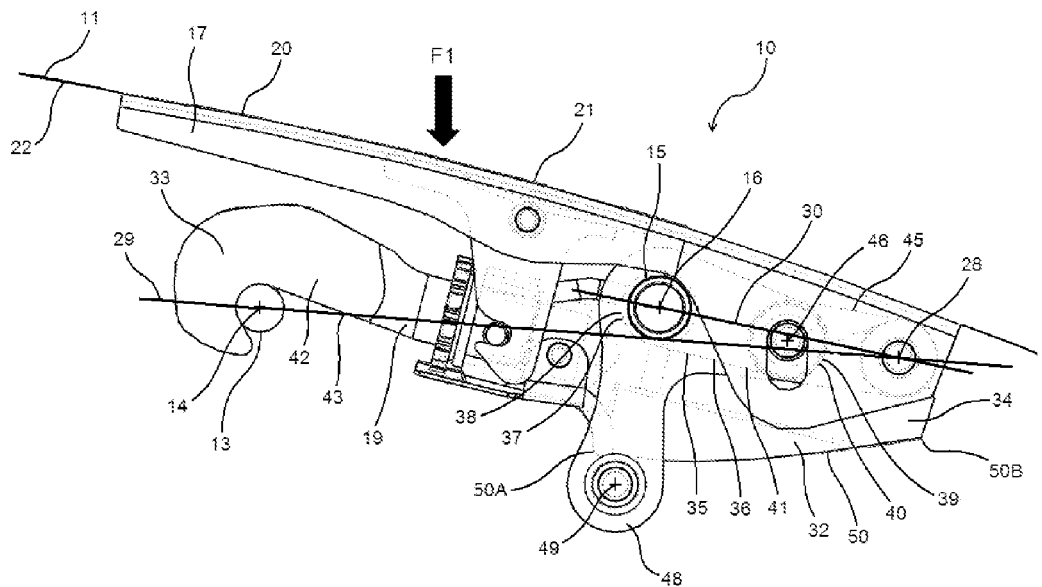
Figure 4:
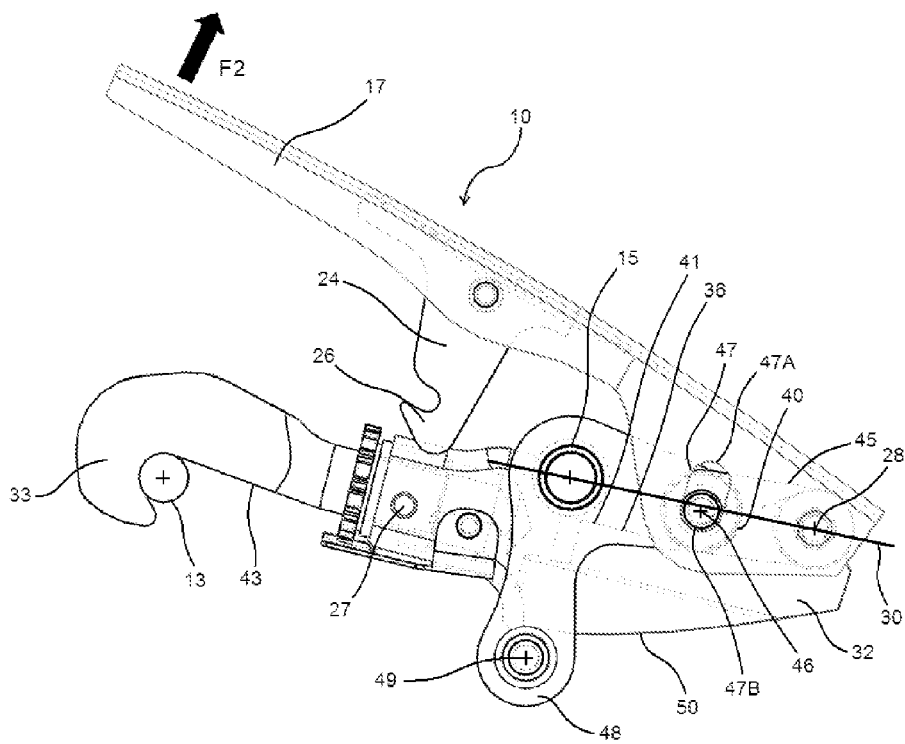
Figure 5:
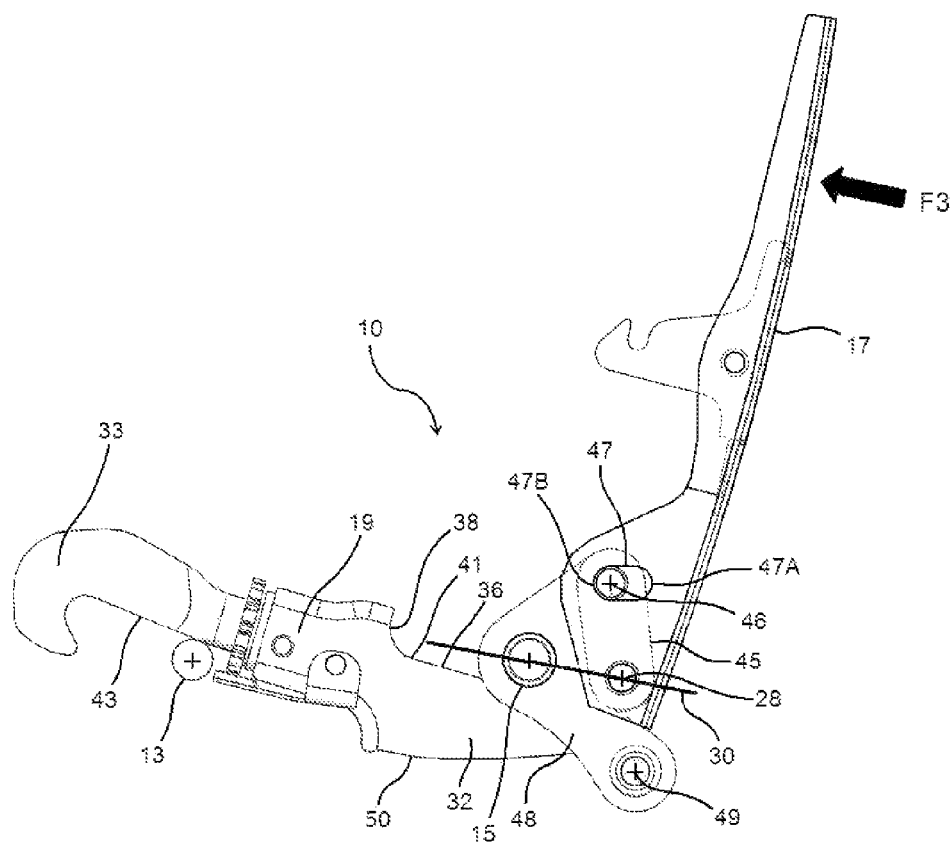
Figure 6:
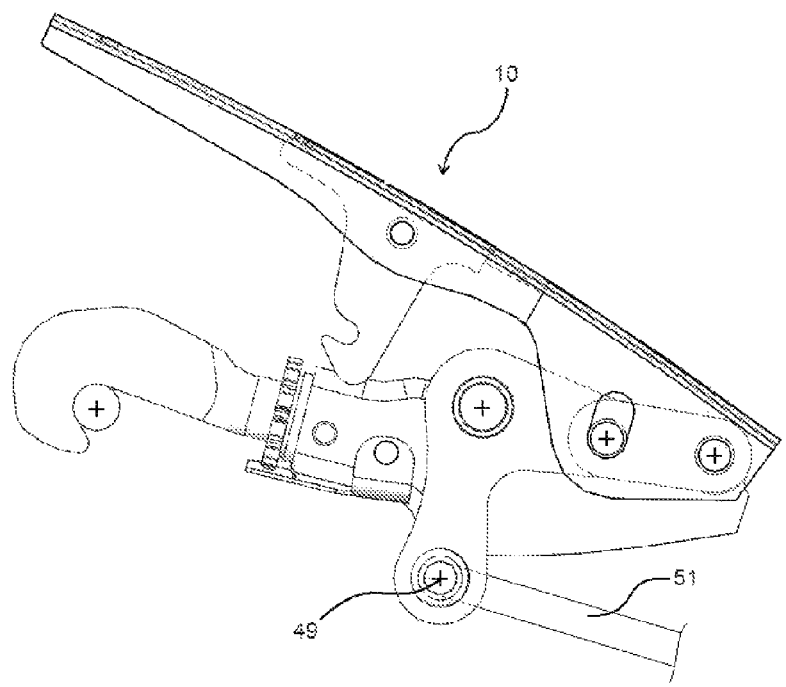

It will be possible to more clearly understand the invention upon reading the following description and examining the accompanying figures. They are given for informational purposes and in no way limit the invention. The figures show:

FIG. 1 (already described): a side view of a hook latch known from the prior art;

FIG. 2: a perspective view of a hook latch in the so-called locked position with a handle in the so-called closed position, according to one embodiment of the invention;

FIG. 3: a side view of the hook latch in the locked position with the handle in the closed position according to the embodiment of the invention in FIG. 2;

FIG. 4: a side view of the hook latch in the locked position with the handle in the so-called partially open position according to the embodiment of the invention in FIG. 2;

FIG. 5: a side view of the hook latch in a so-called unlocked position, according to the embodiment of the invention in FIG. 2;

FIG. 6: a side view of the hook latch in the locked position with the handle in the so-called partially open position according to another embodiment of the invention.

In the various figures, the same components have the same reference numbers.

FIGS. 2 and 3 respectively show a perspective and side view of a hook latch 10 according to one embodiment of the invention. In FIGS. 2 and 3, the lock 10 is in a so-called locked position.

The lock 10 is configured so as to lock a mobile structure (not shown) to and unlock it from a fixed structure 11 on a vehicle such as an aircraft. For example, the fixed structure 11 could be the fuselage of an airplane, and the mobile structure could be a hatch.

In the example, the lock 10 is positioned so as to lock a mobile structure to a fixed structure 11 of an aircraft. In the longitudinal direction, the lock 10 has a plane of symmetry 12 crossing it at its midpoint.

The fixed structure 11 comprises a first bracket (not shown) in which a rod 13 with a circular cross-section, extending along a first transverse axis 14, forms a keeper 13 for the lock 10.

The mobile structure comprises a second bracket (not shown) in which a first pin 15, extending along a second axis 16 parallel to the first keeper 13, forms a pivot around which the lock 10 can be guided in its rotation in relation to the mobile structure.

It should be noted that the keeper 13 can also be placed on the mobile structure, while the first pin 15 may be placed on the fixed structure 11. Such placement of the keeper 13 and the first pin 15 in no way affect the following description.

Traditionally, the lock 10 comprises a handle 17 equipped with a flush-mounted trigger 18, as well as a lock strut 19.

The handle 17 and the trigger 18 each have an edge 20 and 21, respectively, with a shape complementary to a surface of the mobile structure and/or to a surface 22 of the fixed structure 11, such that when the lock 10 is in the locked position and the handle 17 is in the so-called closed position, the edges (20, 21) touch the surface of the mobile structure and/or the surface 22 of the fixed structure 11.

The handle 17 and the trigger 18 also have a pair of flat side edges 23 and 24, respectively, parallel to the plane of symmetry 12.

Between its two side edges 23, the handle 17 has an axis 25, around which the trigger can pivot. The trigger 18 also has a first torsion spring (not shown) opposing the rotation of the trigger 18 around the axis 25.

The side edges 24 of the trigger 18 each have a hook 26 able to latch on to the lugs 27 placed on the lock strut 19, on either side of the plane of symmetry 12.

Between its side edges 23, the handle 17 also has a second pin 28 parallel to the keeper 13 and the first pin 15 around which the lock strut 19 can be guided in its rotation.

Together, the keeper 13 and the second pin 28 define a first plane 29. The first pin 15 is placed on the side of the handle 17 in relation to the first plane 29, regardless of the position of the lock 10.

Together, the first and second pins (15, 28) define a second plane 30.

The lock strut 19 has a cylindrical central section 31 along the longitudinal axis of the lock 10. The central section 31 is extended on one side by a so-called distal section 32 and on the other side by a hook 33.

The hook 33 can latch onto the keeper 13 on the fixed structure 11. When the hook 33 is latched onto the keeper 13, the lock 10 is considered to be locked. On the other hand, when the hook 33 is not latched onto the keeper 13, the lock 10 is considered to be unlocked.

One end 34 or the distal section 32, located opposite the hook 33, houses the second pin 28.

A first side 35 of the distal section 32, in relation to the edge 20 of the handle 17, has an open groove 36 located along an axis 10 parallel to the second pin 28.

A first side 37 of the groove 36, near the central section 31, forms a first stop 38 against which the first pin 15 rests when the lock 10 is in the locked position. The first stop 38 can block the movement of the first pin 15 in relation to the lock strut 19, in the direction of the hook 33.

A second side 39 of the groove 36, near the end 34 of the distal section 32, forms a second stop 40 against which the first pin 15 rests when the lock 10 is unlocked. The second stop 40 can block the movement of the first pin 15 in relation to the lock strut 19, in the direction of the end 34 of the distal section 32.

A third side 41 of the groove 36, in relation to the edge 20 of the handle 17, can slide on the first pin 15 when the lock 10 moves from the locked position to the unlocked position, and vice versa.

The hook 33 also comprises a linear segment 42, with an edge 43 that can slide on the keeper 13.

In the example, the lock has a blind hole in the central section 31 into which the hook 33 is inserted through the intermediary of a fit-in-part 44, a nut, for example. The fit-in-part 44 makes it possible to adjust the depth of the hook 33 in the central section 31 of the locking strut 19 and thus to adjust the tension between the keeper 13 and the hook 33. However, the lock strut 19 could also be a single piece, without a fit-in-part.

The lock 10 also comprises a first connecting lever 45 linking the second pin 28 with a third pin 46, located parallel to the second pin 28.

On each of the side edges 23 of the handle 17, the third pin 46 moves across an oblong opening 47, with two opposing ends 47A and 47B, between which the third pin 46 can slide. Thus, in the locked position, the third pin 46 is in contact with the first end 47A, whereas when the lock 10 is unlocked and the handle 17 is said to be partially or completely open, the third pin 46 is in contact with the second end 47B of the oblong opening 47. The oblong opening 47 allows the third pin 46 to move when the handle 17 is in rotation around the second pin 28.

The lock 10 also has a second connecting lever 48 connecting the third pin 46 with the first pin 16. The length of the first connecting lever 45 and second connecting lever 48 are defined such that the third pin 46 is pushing against the second stop 40 when the lock 10 is locked.

The lock 10 is configured so that the edge 20 of the handle 17 is placed opposite the third pin 46 in relation to the second plane 30, which is to say that the third pin 46 is located below the second plane 30 linking the second pin 28 and the first pin 15 when the lock 10 is locked.

Thus, when the lock 10 is locked, a first toggle lever, formed by the first and second levers (45, 48) and articulated to the third pin 46, is in the so-called tight position.

In this manner, the edge 20 of the handle 17 and the edge 21 of the trigger 18 can fit closely against the surfaces of the mobile structure and the fixed structure 11 with a small radius of curvature. Moreover, the keeper 13 and the first pin 15 can be placed closer to the fixed and mobile structures, thus reducing the length of the brackets holding said pins, and therefore reducing their weight.

In the example, the second connecting lever 48 is L-shaped. The second connecting lever 48 has two links on either end of the lock strut 19, connected to each other with a fourth pin 49 parallel to the first and third pins (15, 46).

The fourth pin 49 pushes against a second side 50 of the distal section 32 of the lock strut 19, opposite the first side 35 of the distal section 32.

In the locked position, the fourth pin 49 is positioned at a first end 50A of the second side 50, located near the central section 31 of the lock strut 19. Preferably, the first end 50A is placed perpendicular to the first stop 38.

The distance between the first and fourth pins (15, 49) in the plane of symmetry 12, corresponding to a length of the second connecting lever 48 between these two pins, is defined to take up the forces operating on the keeper 13 and/or on the first pin 15, when the lock 10 is locked. Thus, the first toggle lever will stay tightened. In fact, in the sense that the first pin 15 is placed on the side of the handle 17 in relation to the first plane 29, regardless of the position of the lock 10, the second pin 28 cannot oppose the movement of the lock strut 19 in the direction of the keeper 13. In the absence of the fourth pin 49, the forces acting on the second pin 28 would then tend to pull the latter toward the interior of the structure of the aircraft, thus tipping the lock 10 around the first pin 15. The fourth pin 49 opposes this movement by exerting a reaction force on the lock strut 19, allowing the lock 10 to remain the locked position.

The fourth pin 49 can slide against the second side 50, from the first end 50A to the opposite second end 50B. Preferably, the second end 50B is placed perpendicular to the second pin 28, against which the fourth pin 49 rests when the lock is unlocked.

The second side 50 plays the role of a cam surface. The second side 50 has a convex edge, linking the first end 50A to the second end 50B. Thus, when the first toggle lever is in the tightened position and the fourth pin 49 is placed at the first end 50A, the second toggle lever is in the so-called tightened position.

The lock 10 can be unlocked as follows.

An operator first presses the trigger 18 (FIG. 3, arrow F1), which unlatches the hooks 26 from the lugs 27 through the action of the first spring. Under the action of a second spring (not shown) and thanks to the oblong opening 47, the handle 17 moves away from the lock strut 19 by pivoting around the second pin 28, and the third pin 46, initially in contact with the first end 47A of the oblong opening, slides in the opening 47 until it comes into contact with the second end 47B.

The handle 17 is now blocked in the partially open position, shown in FIG. 4. In this position, the first and second toggle levers are still in the tightened position, the hook 33 is thus still latched onto the keeper 13, and the lock 10 is still locked.

When the handle 17 is in the partially-open position, an angle defined between a third plane, formed by the keeper 13 and the first pin 15, and the edge 20 of the handle 17 is approximately fifteen degrees. The angle allows the operator to slide a hand under the handle 17 to grab hold of it.

In a second step, to unlock the lock 10, the operator pulls on the free end of the handle 17 (FIG. 4, arrow F2) opposite the second pin 28 so as to further pivot the handle 17. The third pin 46, together with the first and second connecting levers (45, 48), then moves above the second plane 30, pulled by the second end 47B of the oblong opening 47. Simultaneously, the edge 43 of the hook 33 slides on the keeper 13 in order to release from it, the fourth pin 49 slides on the second side 50 of the distal section 32 of the lock strut 19, and the third side 41 of the groove 36 of the distal section 32 slides on the first pin 15, until the first pin 15 is in contact with the second stop 40. Once the first pin 15 is in contact with the second stop 40, the lock 10 is unlocked and the mobile structure can be opened (FIG. 5).

From the unlocked position, the lock 10 is locked as follows.

The operator first pushes on the free end of the handle 17 opposite the second pin 28 (FIG. 5, arrow F3) so as to move the handle 17 toward the lock strut 19. While rotating the handle 17, the third pin 46 together with the first and second connecting levers (45, 48), initially in contact with the second end 47B of the oblong opening 47, enters into contact with the first end 47A of the oblong opening. Then, the third pin 46 moves below the second plane 30, pulled by the first end 47A of the oblong opening 47, when the operator continues to push on the handle. Simultaneously, the edge 43 of the hook 33 slides on the keeper 13 in order to latch onto it, the fourth pin 49 slides on the second side 50 of the distal section 32 of the lock strut 19, and the third side 41 of the groove 36 slides on the first pin 15, until the first pin 15 is in contact with the first stop 38 and the third pin 46 is in contact with the second stop 40. Also simultaneously, the hooks 26 on the trigger 18 engage with the lugs 27 on the lock strut 19. The lock 10 is now locked with the handle 17 in the closed position, in a single phase.

The kinematics of the lock 10 are especially advantageous, as they make it possible to significantly move the hook 33 toward to the keeper 13 through the use of a mechanical tightening system with two toggle levers, while enabling the handle 17 to be incorporated into a structure 30 with a small radius of curvature.

FIG. 6 shows a lock 10 also comprising a control rod 51 linked to the fourth pin 49.

The control rod 51 is for example a rod with a ball joint or a cable, such that the control rod 51 can pivot around the fourth pin 49 in all directions. The control rod 51 may be connected to a flag, whose appearance outside the structure visually indicates that the lock 10 is in fact unlocked. In another variant, the control rod 51 may linked to an adjacent lock to control its opening.

Upon opening or closing the lock 10, the control rod 51 moves with the fourth pin 49, pulling a mobile part of the mechanism to which it is connected as it moves.

Thus, the unlocking and locking of a lock 10 described above and equipped with a control rod 51 makes it possible to simultaneously control the triggering of another mechanism, without the operator having to engage the other mechanism.

The invention claimed is:

1. A lock for locking a mobile structure to and unlocking it from a fixed structure of a vehicle, one of the two structures containing a keeper, the other structure containing a first pin around which the lock can pivot, the lock comprising:
    a lock strut containing a hook able to latch onto the keeper and comprising a first side in contact with the first pin;
    a handle having a second pin around which the lock strut can pivot, and having a third pin, located between side edges of the handle;
    a first connecting lever linking the second pin to the third pin;
    a second connecting lever linking the third pin to the first pin;
    wherein the second connecting lever contains at one end a fourth pin in contact with a second side of the lock strut, said second side being opposite the first side, wherein, to latch or unlatch the hook from the keeper, the handle is pivoted around the second pin such that the first side of the lock strut slides on the first pin, and the fourth pin slides on the second side of the lock strut.

2. A lock according to claim 1, in which the second connecting lever is L-shaped.

3. A lock according to claim 2, in which the lock strut comprises a distal section on the first side opposite the hook, consisting of a groove forming a first stop able to block the first pin from moving toward the hook, and a second stop able to block said first pin from moving in a direction away from the hook.

4. A lock according to claim 3, in which the length of the second connecting lever is defined so that when the hook is latched onto the keeper, the first pin is pushing against the first stop.

5. A lock according to claim 3, in which the length of the second connecting lever is defined so that when the hook is not latched onto the keeper, the second pin is pushing against the second stop.

6. A lock according to claim 1, in which the handle side edges have each an oblong opening, the third pin being able to slide in said openings.

7. A lock according to claim 1 wherein the second side of the lock strut has a convex edge, from a first end located near the hook to a second end opposite the first end, located near the second pin.

8. A lock according to claim 1, wherein the fourth pin is linked to a control rod able to control the triggering of an adjacent mechanism when the lock is engaged in a locked or unlocked position.

9. A lock according to claim 1, in which the lock strut comprises a distal section opposite the hook, consisting of a groove forming a first stop able to block the first pin from moving toward the hook, and a second stop able to block said first pin from moving in a direction away from the hook.

10. A lock according to claim 9, in which the length of the second connecting lever is defined so that when the hook is latched onto the keeper, the first pin is pushing against the first stop.

11. A lock according to claim 9, in which the length of the second connecting lever is defined so that when the hook is not latched onto the keeper, the first pin is pushing against the second stop.

* * * * *